Oct. 18, 1966  J. J. SCHOLTEN ETAL  3,279,610
WATER-TREATING APPARATUS
Filed July 27, 1964                3 Sheets-Sheet 1
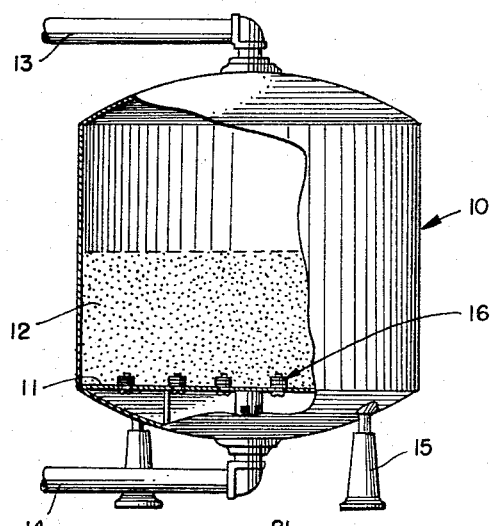
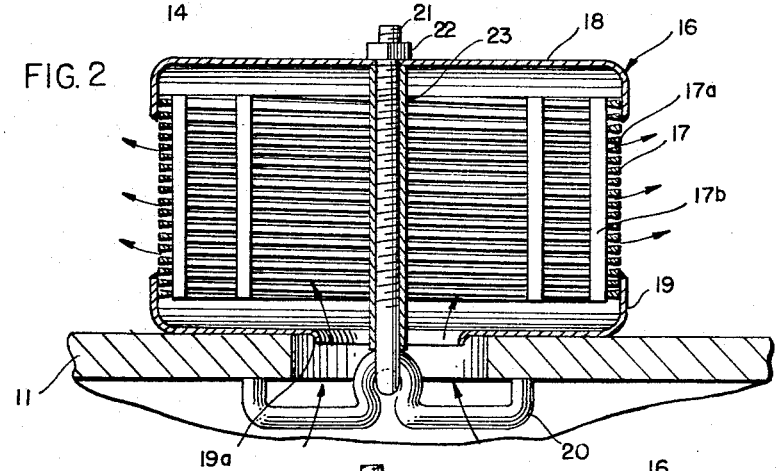
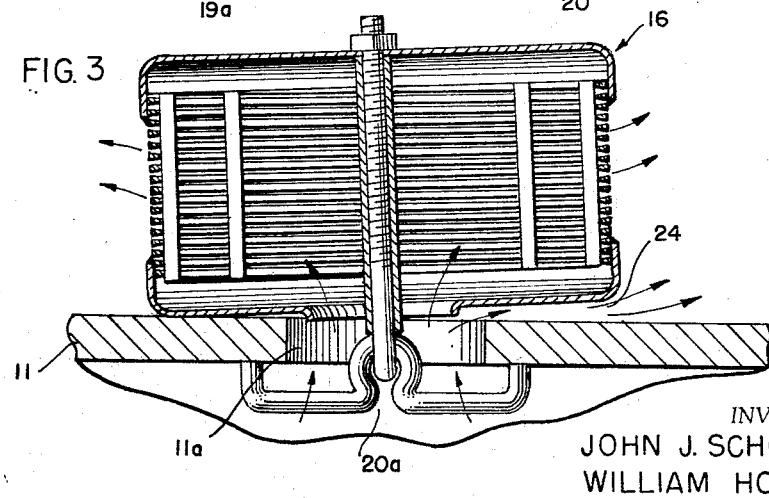
INVENTORS:
JOHN J. SCHOLTEN
WILLIAM HOWARD
BY Dawson, Tilton, Fallon, Lungmus & Alexander
ATT'YS

INVENTORS:
JOHN J. SCHOLTEN
WILLIAM HOWARD

BY Dawson, Tilton, Fallon, Lungmus & Alexander
ATT'YS

United States Patent Office 3,279,610
Patented Oct. 18, 1966

3,279,610
WATER-TREATING APPARATUS
John J. Scholten, Ames, and William Howard, Des Moines, Iowa, assignors to General Filter Company, Ames, Iowa
Filed July 27, 1964, Ser. No. 385,347
2 Claims. (Cl. 210—279)

This invention relates to water-treating apparatus, and, more particularly, to apparatus incorporating novel filtering elements.

The general field of activity with which the invention is concerned includes not only filters but related apparatus such as zeolite softeners, demineralizers, etc. Conventionally, such equipment includes an "underdrain" plate equipped with filtering elements, the plate being disposed in a vessel and dividing the vessel into an upper portion and a lower portion. Normally, the upper portion contains treatment media which is supported on the underdrain plate. The filter elements are arranged to permit water to pass freely in either direction. Exemplary of a previous approach in this general area is the co-owned Reissue Patent No. 24,275.

Heretofore, the filter element-equipped underdrain plates have supported graded gravel in addition to sand, or the like. In the instant invention, it is an object to provide apparatus which does not require graded gravel as a portion of the treatment media. With the prior art devices, the filter openings were relatively large, since there was no need for retaining fine particles such as filter sand. The provision of water-treatment apparatus which utilizes an underdrain plate equipped with filter elements capable of retaining fine particles such as filter sand thus constitutes another object of the invention.

The underdrain plates or "false bottoms" on which the underdrain screens are supported are not normally strong enough to withstand the differential pressures or backwashing which can be developed if the screens become plugged. Thus, still another object of this invention is to provide an integral pressure release means which will operate automatically in the event of screen fouling, preventing damage to the screen and to the "false bottom."

The invention is described in connection with the accompanying drawing, in which—

FIG. 1 is an elevational view, partially in section, of a vertical treatment tank consisting of a single cell and which embodies the novel filter element-equipped underdrain plate of the invention;

FIG. 2 is an enlarged fragmentary sectional view through one of the filter elements of FIG. 1;

FIG. 3 is a view similar to FIG. 2 but showing the filter element in a relieved condition so as to eliminate the tendency of backflow water to rupture portions of the equipment;

Figure 4:
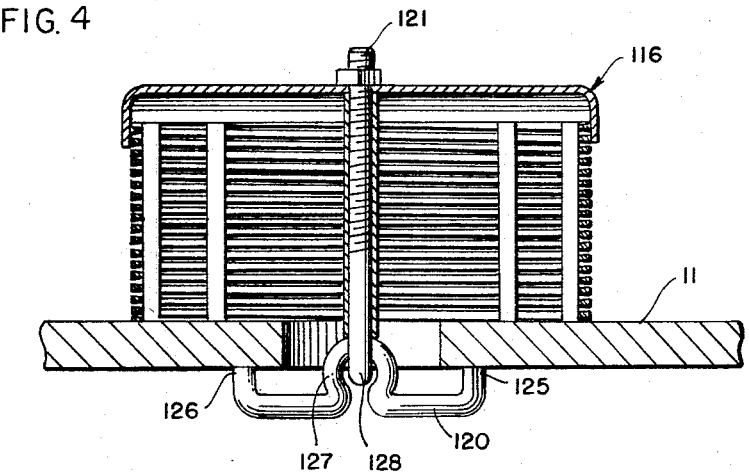
FIG. 4 is an elevational view, partially in section, of a modified form of filter element.

In the illustration given and with particular reference to FIG. 1, the numeral 10 designates generally a vertical treatment tank. It will be immediately appreciated that a single unit is not essential to the practice of the invention, and, for that matter, multiple cells of the type seen in the above-mentioned Reissue Patent No. 24,275 are equally advantageously used. However, a single unit is shown and described for the purpose of simplicity of explanation.

The tank 10 includes the previously-mentioned underdrain plate 11 which is disposed generally horizontally and on which is supported the treatment media—normally, filter sand. The filter sand in FIG. 1 is designated by the numeral 12. Means for introducing water to be treated into the tank 10 includes a pipe 13 (which may be for gravity flow) and a discharge pipe 14 is connected to the tank at the bottom thereof. The tank 10 may be advantageously supported on feet or pedestals 15. Lastly, the numeral 16 designates generally a filter element mounted on the plate 11 and which incorporates novel pressure release means. The element 16 is seen in enlarged sectional form in FIG. 2—with FIG. 3 showing the same element in a different condition of operation.

The elements 16 serve the purpose of retaining the fine treatment media. In the past, the openings in the distributor or filtering units were large, requiring the use of graded gravel or other graded material to support the fine treatment media. The previously-employed large openings had the advantage of not being subject to plugging cycle in which the direction of flow is reversed and requiring the additional supporting material, with the attendant increased tank height.

Normally, the water flow passes downwardly through the treatment media and the distributor baffles. The baffles or strainers, i.e., the filter elements 16, are not usually subject to plugging or fouling while the flow is downward, due to the filtering action of the media. Difficulty normally occurs during the backwashing or cleaning cycle in which the direction of flow is reversed and the rate of flow is substantially increased.

The source of backwash water can be from storage tanks or "in-service" filter cells. These tanks, filter cells, and connecting piping frequently contain rough particles, precipitated chemicals such as calcium carbonate, and other foreign materials. These foreign materials are frequently heavier than water and settle out in the tanks, piping, etc. They normally do not move with the water flow unless a high water velocity occurs to flush them out. High backwash rates of flow frequently do produce the high velocity needed to move these particles. It is with this phenomenon that the invention is principally concerned, inasmuch as the screen openings are relatively small, of the order of 0.010 inch wide.

An exemplary filter element can be seen in FIG. 2, where the numeral 16 again designates such an element. The element 16 includes a screen 17 of generally annular or cylindrical shape, wherein the screen contour is developed by helically disposing a generally rectangular bar 17a and supporting the same by means of integral posts 17b. Such a screen is commercially available under the designation "Johnson Screen 3½" O.D. x 1½" long, 0.010" slots, 0.060 wire," obtainable from Edward E. Johnson, Inc., of St. Paul, Minnesota. It will be appreciated that a wide variety of screens can be used in the practice of the invention. However, a specific illustration is set down here in order to teach the best presently known mode of practicing the invention.

The screen 17 is seen to be equipped with end caps 18 and 19, each of which is essentially cup-shaped, with the bottom cap 19 being centrally apertured as at 19a to accommodate water flow and also the means for securing the filter element 16 to the underdrain plate 11. The element-retaining means includes a toggle bolt assembly including a toggle element 20, bolt 21, nut 22, and spacer sleeve 23.

As can be appreciated from a comparison of FIGS. 2 and 3, the toggle assembly permits rocking of the filter element 16 relative to the underdrain plate 11. In FIG. 2, the flow of backwashing water has not resulted in a plugging or fouling of the screen 17, while in FIG. 3 the fouling has proceeded to a point that pressure relief is necessary, and such is achieved by the rocking action of the filter element 16 to provide an additional outflow path as at 24 (see FIG. 3).

As mentioned previously, if a sufficient quantity of foreign material is carried inside the screens 17, these will become fouled, preventing passage of water. When this occurs, the full pressure of the backwash water source is applied to the botom side of the underdrain plate 11, while the top side of the plate is subject to a pressure of approximately 2 or 3 p.s.i. Under these conditions, it would not be uncommon to have a differential pressure of upwards of about 58 p.s.i., assuming a backwash source or main pressure of 60 p.s.i. Most underdrain plates are designed to withstand a differential pressure of approximately 10 p.s.i., and fail with substantially higher differential pressures. While the underdrain plates could be designed for higher pressures, it is uneconomical to do so.

To protect the underdrain plate 11, the toggle assembly previously described functions analogous to a spring. The toggle-spring assembly is pre-tensioned by tightening the nut 22 on the toggle bolt 21. Thus, the differential pressure at which the filter element 16 will lift off the underdrain plate 11 (relieving the pressure differential) can be controlled by the tightening of the nut 21 during installation. We find it advantageous to construct the toggle spring assembly to allow the filter element 16 to rise and prevent differential pressures across the underdrain plate during backwashing in the range of 5 to about 20 p.s.i.g., and most preferably in the narrower range of about 10 to about 50 p.s.i.g.

A variation of the filter element can be seen in FIG. 4, where the element is designated generally by the numeral 116, and is seen again to be supported on an underdrain plate designated 11. The toggle element 120 is as seen in FIGS. 2 and 3, and includes a length of formed wire having ends as at 125 and 126, normally bearing on the underside of the underdrain plate 11. The wire toggle 120 is equipped with a centrally deformed or U-shaped portion 127 which is received within the eye 128 of the toggle bolt 121. The essential difference between the construction of FIGS. 2 and 4 is that the FIG. 4 showing dispenses with the bottom cap 19 of FIG. 2.

Figure 5:
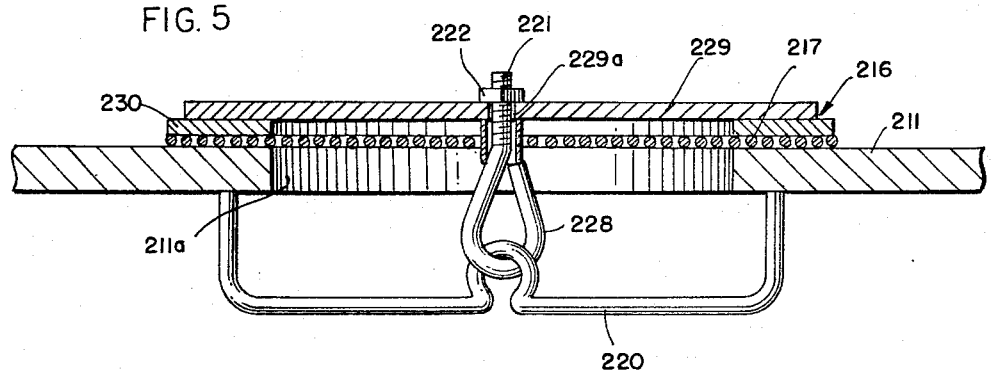
FIGS. 5, 6 and 7 are fragmentary sectional views of still other modifications of the filter element used in the practice of the invention.

Another variation is seen in FIG. 5, where the numeral 211 designates the underdrain plate which is seen to carry a filter element generally designated 216. The element 216 includes a strap 229, apertured as at 229a for the receipt of the toggle bolt 221. As before, a nut as at 222 is provided for developing the biasing of the toggle assembly which includes the toggle element 220 suitably received within the eye 228 of the toggle bolt 221.

In FIG. 5, the screen 217 is planar and is disposed across the aperture 211a in the underdrain plate 211. A flat ring 230 is disposed above the screen 217 and, in combination with the bar or strap 229, confines the screen in place. Thus, the ring 230 and bar 229 coact to provide two essentially hemi-circular openings for ingress and egress of water.

Figure 6:
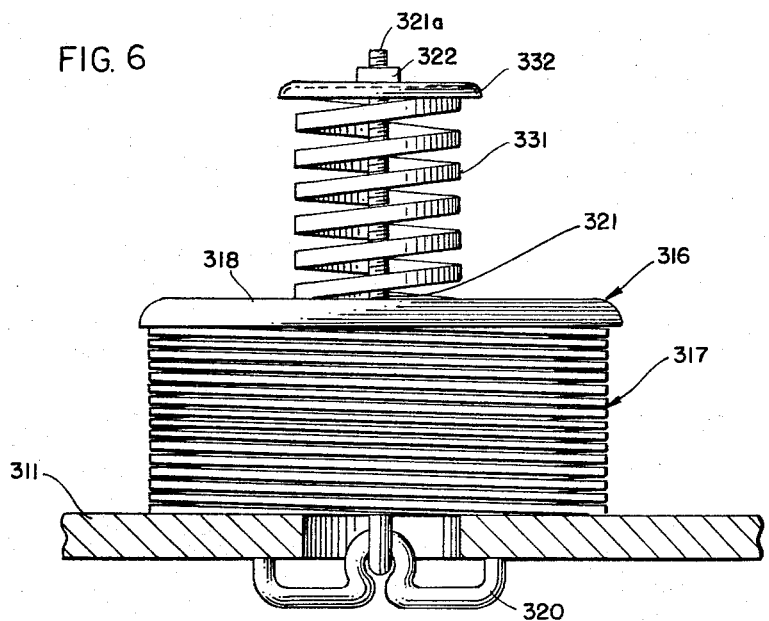
Figure 7:
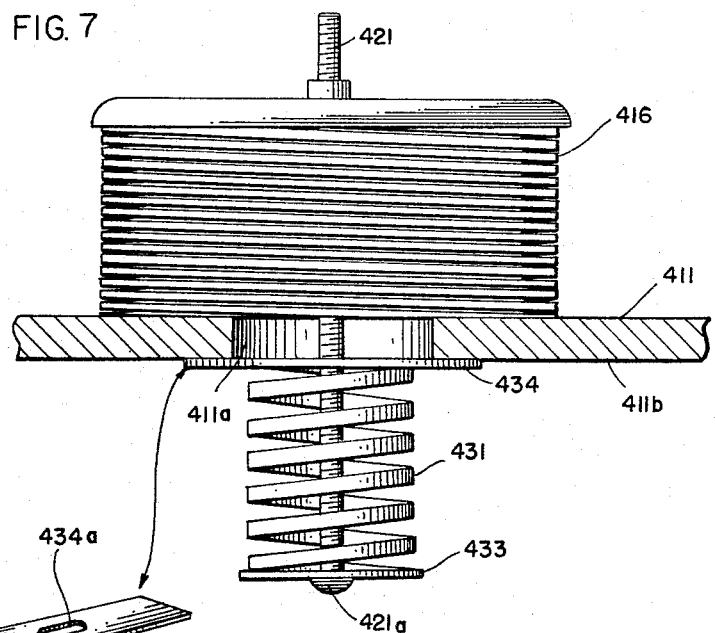

In FIGS. 6 and 7, yet other modifications of the basic teaching are seen. In FIG. 6, the screen 317 is the same as that seen in FIGS. 2-4. As in FIG. 4, the element 316 of FIG. 6 lacks the bottom cap, and in addition has a supplemental spring 331 disposed about the bolt 321. The bolt 321 under the nut 322 is equipped with a spring retainer disc 332, all of which coact with the toggle 320 in biasing the element 316 relative to the plate 311.

Figure 8:
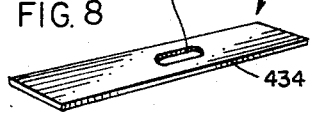
FIG. 8 is a perspective view of the retaining member or bar which is centrally disposed in FIG. 7.

In FIG. 7, the element 416 is essentially the same as that seen in FIG. 6, being biased relative to the underdrain plate 411 by means of a helical spring 431. The spring 431 is confined between a bottom disc 433 and a strap 434 (see also FIG. 8). The strap 434 is centrally apertured at 434a, and only partially obstructs the opening 411a in the plate 411.

In the operation of the device, the embodiment of FIGS. 2 and 3 is advantageously installable on curved or dished underdrain plates. The omission of the bottom cap 19 to provide the element 116 of FIG. 4 develops a unit which is useful for installation on a flat plate. It will be appreciated that the screen elements are useful not only in connection with horizontally-disposed plates, but those disposed at other angles. Further, the filter elements may be used in pressure or gravity treatment tanks and mounted on flat plates, convex, concave, or dished plates as well as plate header and lateral systems. In any event, there is provided a media-retaining underdrain screen for water treatment apparatus having integral pressure relief means which will operate advantageously during reverse or backwash flow to prevent a predetermined differential pressure (across the screen and its support means) from being exceeded.

From the foregoing, it will be appreciated that each of the filter elements includes a housing (cylindrical, in the illustrated embodiment) disposed in covering relation with the apertures in the underdrain plate (for example, the aperture 11a in the plate 11). The housing constituting the element 16, for example, has side and end walls. It will be appreciated from a consideration of FIGS. 2–7 that at least one end wall is required and that the screen material 17 can constitute either the side or end walls (compare FIGS. 2 and 5). Further, the retaining means is essentially resilient (compare FIGS. 2 and 3 wherein the toggle element 20 is deformed or partially collapsed as at 20a to accommodate the rocking or upsetting action of the filter element 16 relative to the plate 11). The resiliency of the elongated element which is advantageously disposed on the axis of the cylindrical housing can be achieved through coil springs as at 331 and 431 in FIGS. 6 and 7, respectively. In FIG. 6, the spring 331 is disposed between the end wall 318 of the elements 316 and the upper end 321a of the bolt 321. In FIG. 7, the spring 431 is disposed between the lower end 421a of the bolt 421 and the undersurface 411b of the plate 411. In any event, an end wall of the housing is resiliently coupled to the underside of the confronting plate.

While in the foregoing specification we have set down a description of embodiments of the invention in considerable detail for the purpose of explanation thereof, it will be apparent to those skilled in the art that many variations in the details herein given may be made without departing from the spirit and scope of the invention.

We claim:

1. In water-treating apparatus providing tank means including a horizontally-extending underdrain plate and drain means beneath said plate, a finely-divided treating media supported on said plate, said plate having a plurality of openings therein through which the treated water passes downwardly to said underdrain means and also through which water passes in the opposite direction on the backwashing cycle, a media-retaining screen assembly mounted in covering relation with each of said plate openings and comprising a housing upstanding from said underdrain plate, said housing including at least end and side walls, at least one of said end and side walls being constructed of screen material sized to prevent passage of said finely-divided treating media, an elongated element interconnecting said underdrain plate with each screen assembly, said elongated element extending through the opening associated therewith and extending between said assembly end wall and the side of said plate opposite the side confronting said assembly, said element including resilient means for biasing said assembly toward said plate and capable of being flexed under excessive backwash of water pressure of the order of about five p.s.i. to about 20 p.s.i. across said plate to provide a spacing of said assembly relative to said plate to provide a supplemental flow passage for said backwash water.

2. The structure of claim 1 in which said screen means constitute said housing side wall and the covering cap constitutes said end wall, said elongated element including an eye-equipped pole, said housing being generally cylindrical and said elongated element including an eye-equipped bolt disposed on the axis of said assembly, a toggle member extending through said eye and bearing against the side of said plate opposite the side confronting said assembly.

References Cited by the Examiner

UNITED STATES PATENTS

| | | | |
|---|---|---|---|
| 813,434 | 2/1906 | Jones | 210—497.1 X |
| 2,330,945 | 10/1943 | Becker | 210—488 |
| 2,643,772 | 6/1953 | Martin | 210—289 X |
| 2,872,044 | 2/1959 | Kasten | 210—488 X |
| 3,004,668 | 10/1961 | Adams | 210—293 |
| 3,179,116 | 4/1965 | Jacobs | 210—356 X |

REUBEN FRIEDMAN, *Primary Examiner.*

SAMAH ZAHARNA, *Examiner.*